United States Patent
Beck et al.

[11] Patent Number: 5,385,396
[45] Date of Patent: Jan. 31, 1995

[54] VALVE BLOCK AND METHOD OF ASSEMBLING AN ELEMENT THERETO

[76] Inventors: Erhard Beck, Adolfstrasse 14, D-6290 Weilburg; Albrecht Otto, Albert-Schweitzer-Strasse 2, D-6450 Hanau-Mittelbuchen, both of Germany

[21] Appl. No.: 176,195

[22] Filed: Jan. 3, 1994

Related U.S. Application Data

[62] Division of Ser. No. 778,219, Dec. 11, 1991.

[51] Int. Cl.$^6$ ............................................. B60T 8/32
[52] U.S. Cl. .................................. 303/119.2; 148/563
[58] Field of Search .............................. 148/563, 402; 303/119.2, 113.1; 137/596.17; 29/446

[56] References Cited

U.S. PATENT DOCUMENTS 4,001,928  1/1977  Schweiso ...................... 148/563 X
4,929,038  5/1990  Reinartz et al. .................. 303/119.2

*Primary Examiner*—Robert J. Oberleitner
*Assistant Examiner*—Peter M. Poon
*Attorney, Agent, or Firm*—Robert P. Seitter; J. Gordon Lewis

[57] ABSTRACT

A method of assembling elements into a valve block is described, especially for use with slip-controlled brake systems, in which a sealing ball, valve covers or valve seats are inserted into the valve block to be sealed without using force fitting, swaging or other mechanical working of the parts, to avoid contaminating abrasive particles generated by these processes. The elements are inserted into openings in the valve block housing with a clearance fit, and heated to a temperature higher than the austenite starting temperature causing a memory shape to be restored, which provides a sealing fixation of the elements in respective openings in the valve block.

3 Claims, 1 Drawing Sheet

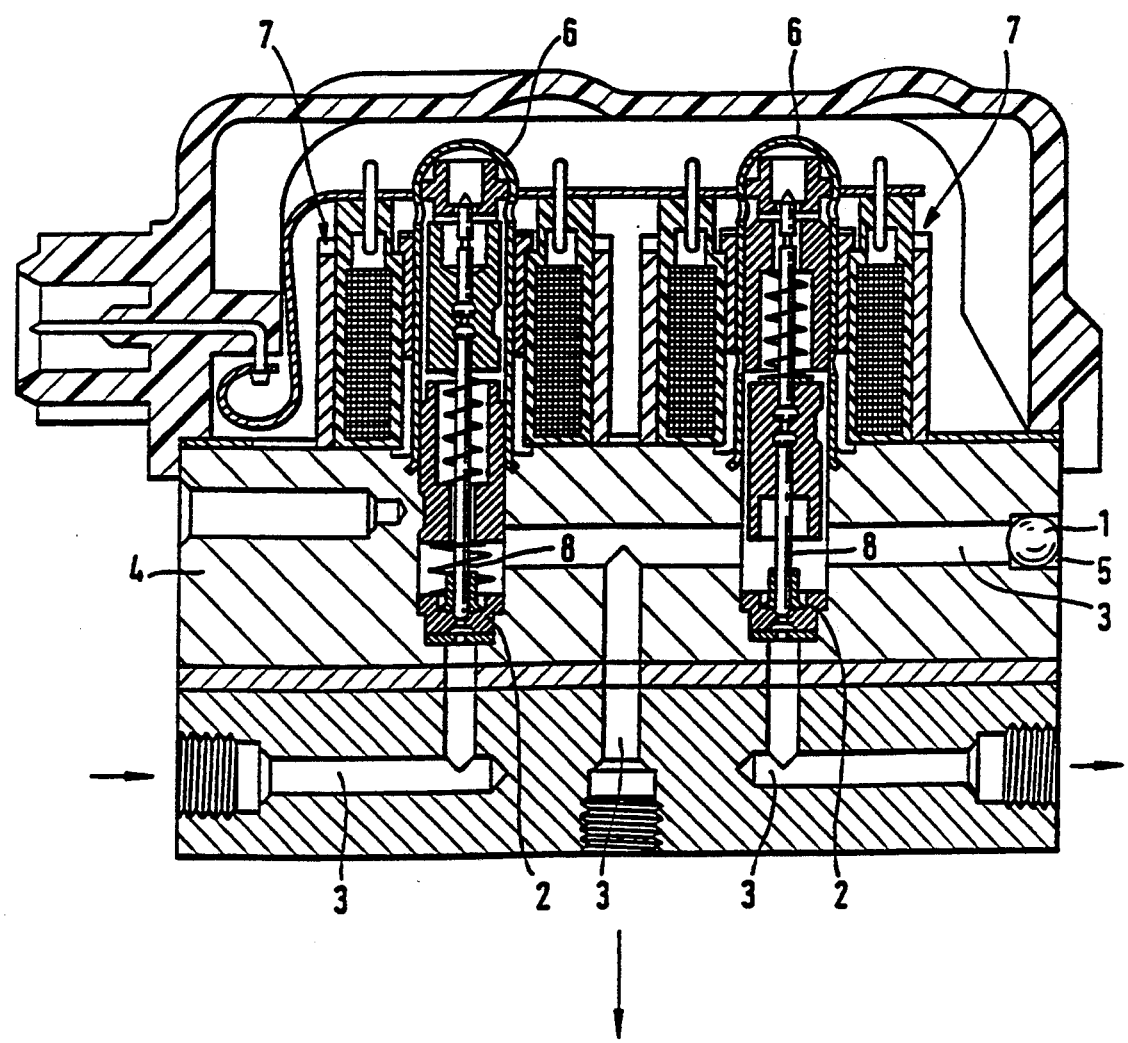

VALVE BLOCK AND METHOD OF ASSEMBLING AN ELEMENT THERETO

This application is a divisional of U.S. application Ser. No. 07/778,219 filed Dec. 11, 1991.

BACKGROUND OF THE INVENTION

The present invention is concerned with a valve block, in particular, for use with slip-controlled brake systems.

For example, DE-OS NO. 37 29 216 discloses a valve block in the valve block housing in which a plurality of hydraulic passageways establish communication between the pressure fluid supply and pressure fluid discharge ports. Valve magnets are provided in the valve block housing and are held on the valve domes, acting as adjusting elements. Passageways completely passing through the valve block housing have a ball element swaged in and acting as a blocking element to seal the passageways.

In the afore-described ball-type seal, there is a great danger of a passageway contamination as a result of abrasion during assembly of the ball. Such contamination has proved to be disadvantageous as having an adverse interfering effect on the magnetic valves during their adjusting movement, and This possible contamination requires that all residues in the passageways be removed during the rinsing operation of the valve block. The use of "king" expanders or plugs of equivalent shape has not proven effective to solve this problem.

Moreover, insertion of the valve domes and associated valve seats into the valve block housing has presented problems as these parts to be inserted also exhibit a surface-damaging force fit and are swaged, so that similarly to the afore-described ball installation, assembly of the valve domes and seats can add to contamination of the passageways.

It is, therefore, the object of the present invention to provide a valve block of the afore-mentioned type which, avoiding the afore-described disadvantages, permits an improved fixation of the parts inserted into the valve block without resulting in surface abrasion and thus contamination of the passages.

SUMMARY OF THE INVENTION

This object is achieved, in the practice of the invention, by use of an element constructed of an alloy material capable of having a "memory shape". The "memory shape" is such as to establish a tight fit with the receiving opening. The element is installed in another shape condition different from the memory shape which allows the element to be freely insertable into the receiving opening. Thereafter, the memory shape is restored by heating to exert a substantial pressure on the receiving opening wall. The element is in a martensitic condition when inserted into the valve block housing openings, and takes an irreversible shape condition when heated beyond the starting temperature of the austenite to thereby insure a secure fixing in the valve block housing. The ball-type closure configured as a blocking element in the passageway of the valve block housing creates a substantial thrust insuring as a result of the austenite formation, a permanent and firm fit of the ball-type member in the passageway.

It has proved to be particularly advantageous for the technical end-use application, to provide the insert parts of the valve block with a shape memory alloy of a nickel and titanium composition, enabling in response to the weight percent composition of the intermetal compound a substantial influence of the austenite starting temperature and, hence, of the conversion temperature within a range of, for example, from minus 100 degrees Celsius to plus 100 degrees Celsius. Moreover, binary alloy shape memory compositions exhibit an excellent corrosion resistance.

According to another embodiment of the principle of the invention, the binary alloy of the parts in the valve block is to be extended as the hysteresis thereof with the aid of special thermodynamic processes to realize, after the deep-temperature shaping, a simplified provision at normal room temperatures for the purpose of an easier assembly of ball, valve seat and valve dome.

Alternatively, it is provided by the invention to use a cryogenic shape memory alloy which, with a view to the high sealing and holding forces of the parts to be inserted into the hydraulic assembly, insures a high austenite strength and strong forces of fixation within a substantial temperature range, e.g., from minus 60 to plus 300 degrees Celsius.

Further features, advantages and fields of end-use application will become manifest from the following description of one example of the invention.

DESCRIPTION OF THE DRAWINGS

The FIGURE is a cross-section of a valve block and parts assembled thereto by a construction according to the invention.

DETAILED DESCRIPTION

The valve block housing 4 is traversed by a plurality of passageways 3. The ball 1 as shown on the right is provided as a blocking element to seal the channel end 5. Valve seats 2 of the magnetic valves 7, are inserted in bores extending across upper passageway 3. In response to an electric current pulse, magnetic valves 7 are operated to control the pressure fluid distribution between the pressure fluid supply (shown with the arrow at the left) and the pressure fluid return (shown with the arrow at the right).

According to the principle of the invention, the ball 1 sealing the channel end, the valve covers 6, as well as the valve seats 2 located below the valve plunger 8 are constituted of a suitable alloy so as to have a "shape memory" characteristic, which at the usual operating temperatures, generate mechanical stresses securely fixing these elements in their corresponding openings in the valve block housing 4.

The temperature-responsive form and force development on parts 1,2,6 to be inserted requires these elements to be in the austenite condition. Moreover, the martensite starting temperature must be below the minimum operating temperature. Consequently, the binary or tertiary shape memory alloy of ball 1, valve covers 6 and valve seats 2 in respect of the example shown is to be laid out for a temperature range of about minus 40 degrees Celsius to 120 degrees Celsius, for which reason cryogenic alloys or the less costly alloys of an extended hysteresis are preferred.

When using an alloy of an extended shape memory, the ball 1, valve domes 6 and valve seats 2 are first in martensitic condition and configured in that condition to fit with a clearance in the corresponding openings. Subsequently, after installation of the elements the valve block housing 4 containing the elements is heated to values above the austenite starting temperature, i.e., above 80 degrees Celsius, thereby enabling the conversion of the austenitic structure to take place. The shape of the elements will substantially change at that time. Parts 1,2,6 will then remain in the austenitic condition without being restored to their original shape.

As a result of the austenitic structure conversion, a mechanical stress resulting from the changed shape, is developed in ball 1, valve domes 6 and valve seats 2, with the mechanical stress generating substantial pressure between the elements and the surrounding surfaces to insure the safe fixation of parts 1,2,6 inserted into the valve block housing 4.

As ball 1, valve domes 6 and valve seats 2, in the martensitic condition, exhibit a clearance fit vis-a-vis the opening in the valve block housing 4, damage to the body surfaces during assembly is precluded by avoiding surface abrasion or even accumulation of chips in channels 3.

Another advantage resides in that the required treatment for corrosion protection after assembly of the ball is eliminated, as binary shape memory alloys are extremely resistant to corrosion.

The shape memory alloy employed in this special example only with the channel closure and the magnetic valves, equally, can be used with a multiplicity of other fields of end-use application in brake hydraulics. This alloy is preferably binary, such as nickel-titanium, in which nickel does not exceed 50% by weight, and titanium does not exceed 55% by weight Fixations of connecting nozzles in the valve block can also be accomplished which in view of their analogy have not been shown. Another suitable material is a tertiary intermetal compound. i.e., a copper, zinc, aluminum alloy for the valve domes 6.

We claim:

1. A valve block, in particular for slip-controlled brake systems, comprising a plurality of valve domes and valve seats inserted into a valve block housing for accommodating the associated magnetic coils and the valve plungers, and comprising a plurality of pressure fluid channels passing through the valve block housing, with closure elements being inserted thereinto, wherein at least one part inserted into the valve block housing is a blocking element which keeps a pressure fluid channel of said valve block housing shut, and in that the blocking element is constructed of a shape memory alloy having an austenite starting temperature at which reversion to said shape memory occurs such that, at a temperature higher than said austenite starting temperature, a locking fixation of said blocking element inserted into the valve block housing is established by a shape change thereof, whereby abraded particles are not formed by locking of said blocking element in said fluid channel.

2. A valve block, in particular for slip-controlled brake systems, comprising a plurality of valve domes and valve seats inserted into a valve block housing for accommodating the associated magnetic coils and the valve plungers, and comprising a plurality of pressure fluid channels passing through the valve block housing, with closure elements being inserted therein, wherein at least one part inserted into the valve block housing is a valve dome, and in said valve dome is constructed of a shape-memory alloy which is constituted by an intermetal compound having an austenite starting temperature at which reversion to said shape memory change, and also having a suppressed shape memory until said austenite starting temperature is reached by said valve dome, so that at a temperature higher than the austenite starting temperature, a locking fixation of the valve dome inserted into the valve block housing is established by a reversion to said shape memory whereby abraded particles in said housing caused by installation of said valve dome are avoided.

3. A valve block, in particular for slip-controlled brake systems, comprising a plurality of valve domes and valve seats inserted into a valve block housing for accommodating the associated magnetic coils and the valve plungers, and comprising a plurality of pressure fluid channels passing through the valve block housing, with closure elements being inserted thereinto, wherein a valve seat is constructed of a shape-memory alloy having an austenite starting temperature at which shape memory reversion occurs, so that, at a temperature higher than the austenite starting temperature, a locking fixation of the valve seats inserted into the valve block housing is established by reversion to said shape memory, whereby abraded particles released into said housing installation of said valve seat are avoided.

* * * * *